Figure 1:
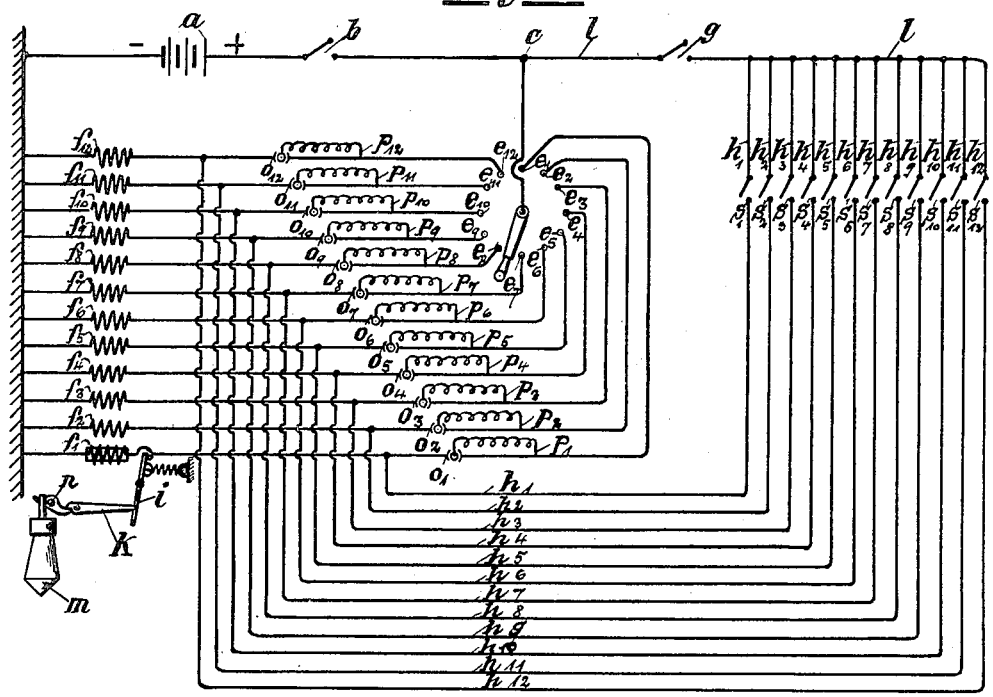

INVENTOR:
Oscar Wilcke

May 15, 1923.

O. WILCKE

BOMB THROWING DEVICE FOR AIRCRAFT

Filed June 28, 1920    4 Sheets-Sheet 3

INVENTOR:

Patented May 15, 1923.

1,454,990

UNITED STATES PATENT OFFICE.

OSCAR WILCKE, OF FRIEDRICHSHAFEN, GERMANY, ASSIGNOR TO THE FIRM: LUFT-SCHIFFBAU ZEPPELIN GESELLSCHAFT MIT BESCHRANKTER HAFTUNG, OF FRIEDRICHSHAFEN, GERMANY.

BOMB-THROWING DEVICE FOR AIRCRAFT.

Application filed June 28, 1920. Serial No. 392,576.

*To all whom it may concern:*

Be it known that I, OSCAR WILCKE, a German citizen, residing at Friedrichshafen, Germany, have invented certain new and useful Improvements in Bomb-Throwing Devices for Aircraft (for which I have filed application in Germany September 13, 1915, Patent No. 315,110, and February 4, 1916, Patent No. 316,786), of which the following is a specification.

My invention relates to a bomb-throwing device for aircraft, and purposes to successfully solve the problem of enabling a large number of bombs to be thrown off from an aircraft either singly, in succession, or in groups of any desired number, and that in any desired order by an electromagnetic release of their suspension means. This object is to be accomplished with complete reliability as regards the dropping of the bombs, along with clearness of arrangement, and convenient manipulation of the single switch devices.

The object is chiefly attained, in accordance with my present invention, by the fact that the electromagnets, acting on the suspension means for the single bombs, may be connected with the source of current both by means of a distributor, adapted to supply them successively with current, as also with shunt branches, which may be rendered active in any number and any order of succession desired by the closing of switches, the distributor serving to drop single bombs, while by switching in the shunt branches, entire groups of bombs may be thrown off simultaneously. Moreover, by means of a system of plugs, the possibility is afforded of the distributor also dropping single bombs regardless of the true order of succession in which they are suspended.

The simultaneous actuation of a group of shunt branches may be effected by means of a special group switch directly connecting the joint conductor, with which all the shunts proceeding from the electromagnets communicate, with the source of current. However, even this group switch may be replaced by the distributor by the joint conductor, to which the parallelly disposed branch shunts are connected, being fed by the respective shunt branch belonging to the distributor contact switched in for the time being.

Preferably a lamp circuit is branched off from the circuit of each electromagnet, and which is controlled by means of a contact, arranged at the suspension device for the bombs, in such a manner that while the bomb is hanging on its hook it will be closed, to be opened the instant the bomb drops. Thus the burning of the indicator lamp denotes that the bomb is hanging in its place, and the moment it is extinguished that the bomb has dropped.

A further feature of this invention resides in the provision of means intended to obviate a deficiency connected with the action of the distributor.

In the form of connection hitherto known, all the contacts belonging to a distributor must be opened while it is in a position of rest, since, in the contrary event, the current would always be switched on to one of the electromagnets, even when no bombs were to be dropped, and the battery serving as the source of current would speedily be spent. Hence, the contact of the electromagnet about to be excited is only closed during the switching motion, and must be re-opened when this motion has been completed. However, the impulse lent to the movable part of the distributor will not, under all circumstances, be so damped as to allow the distributor contact to establish a sufficiently long contact in order to obtain the time required for exciting the electromagnet and accelerating the electromagnetic armature loaded by lever pressure. If the movable portion of the distributor, consist of a switch lever which may be shifted by hand across the stationary contacts, then the inertia appertaining to the human hand may easily cause the contacts being too quickly crossed. If, on the other hand, the movable part of the distributor consist of a contact roller or a contact disc, which is turned stepwise by means of a switch lever and a switch hand wheel, then again, owing to the inertia of the masses moved, the contact may again be crossed at too great a speed. Thus it may happen in connection with the arrangement described, that notwithstanding the distributor lever, respectively, the switch lever, having been properly manipulated, the bomb will fail to drop.

This drawback is obviated by a drag switch, say, one embodying a knife switch, being actuated contemporaneously with the stepwise rotation of the movable distributor member (contact roller or disc) into the contact position required for the time being; the said drag switch or other being disposed in series with the distributor contact. By these means, the duration of the current closing period is adequately extended, since the motion of the distributor lever, or of the lever supporting the knife being retarded by the drag contact. Now this retardation will already suffice for the case so far considered, namely of the distributor contact being open when in the state of rest, and closed during the switching operation. The interconnection of the drag contact, however, in addition affords the possibility of the distributing contacts being always closed when the distributor is in a state of rest, for the current is only switched in as long as the drag contact is switched in, so that the distributor coming to a standstill while the contact is closed will have no injurious effect. It thus results that in this improved arrangement the entire period of closing the drag contact is utilized for the purpose of feeding the electromagnet, so that there is provided ample security for the contact lasting as long as required. A special advantage will be obtained by the series connection of this said drag contact over and above the arrangement of single branch currents in the case of airships. To safeguard against an ignition of the gas carrying the airship, all the contacts, where spark formation is liable to arise, must be kept in a spark-proof oil cage. Such a requirement naturally involves the necessity of rendering the structure considerably more intricate. If, on the other hand, the drag contact connected to the distributor contacts be so arranged that the switching from one distributor contact on to the next will already be completed before the drag contact shuts the current, then the operation of changing contacts at the distributor will be effected in the absence of current. The only possibility for the formation of sparks prevails at the drag contact while it is being either opened or closed. For this reason it will suffice if only the drag contact be placed in an oil cage, so that by the interconnection of the said contact the structure of the switch arrangement will be substantially simplified and cheapened.

Figure 6:
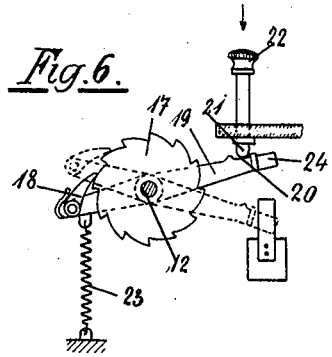
Figure 7:
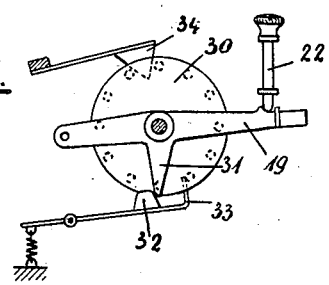
Figure 2:
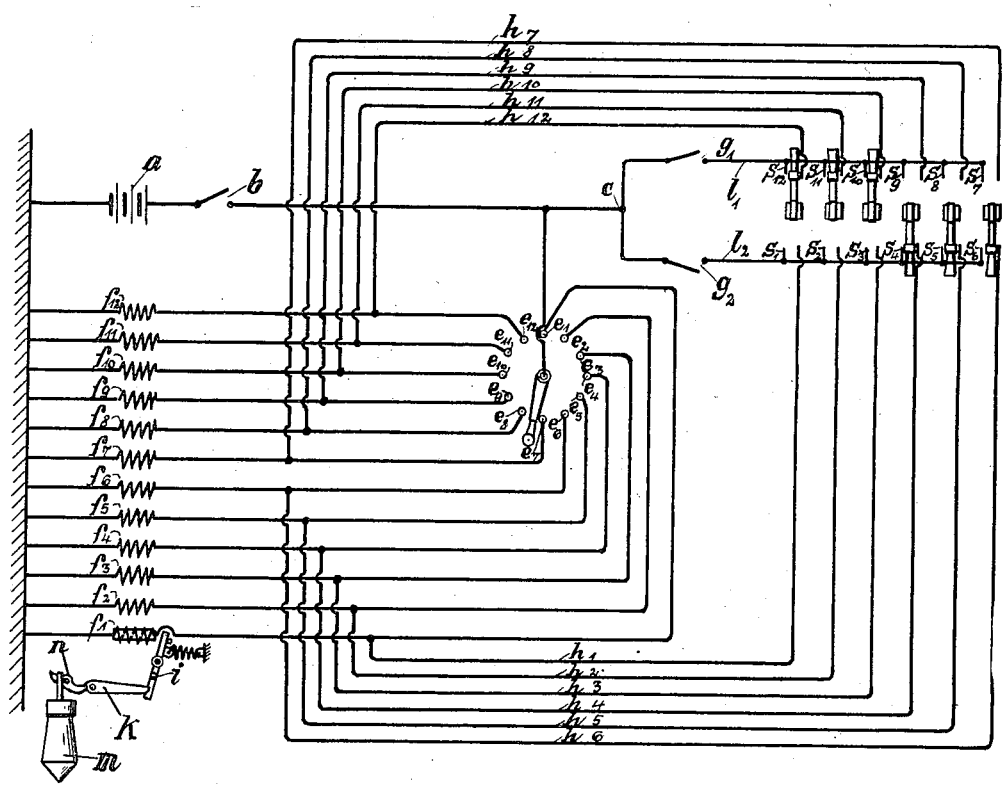
Figure 3:
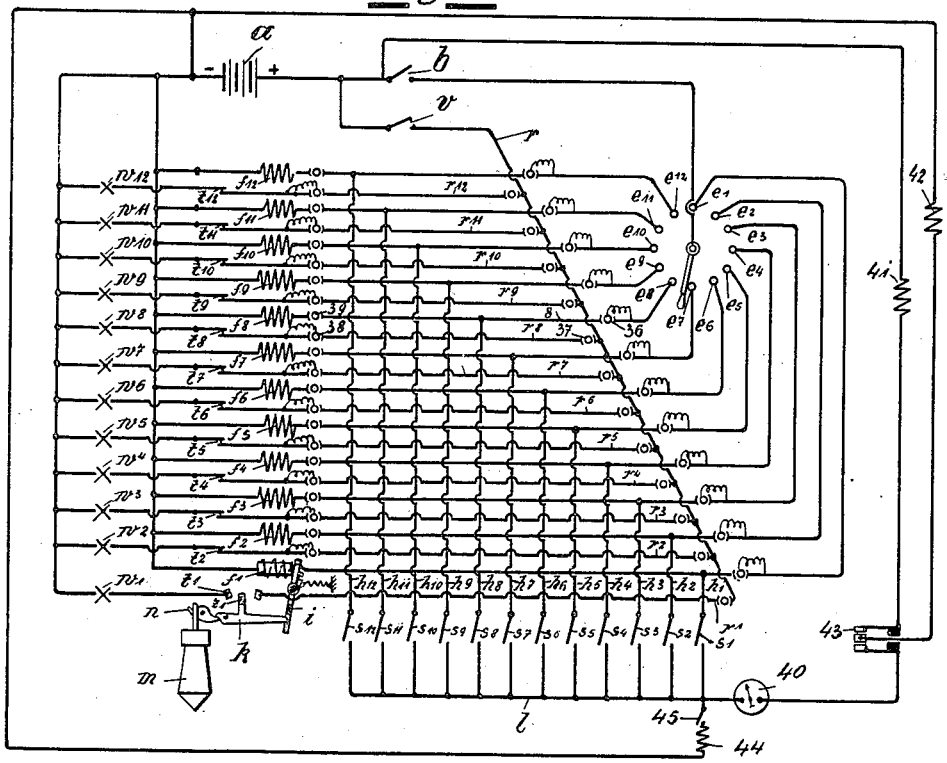
Figure 4:
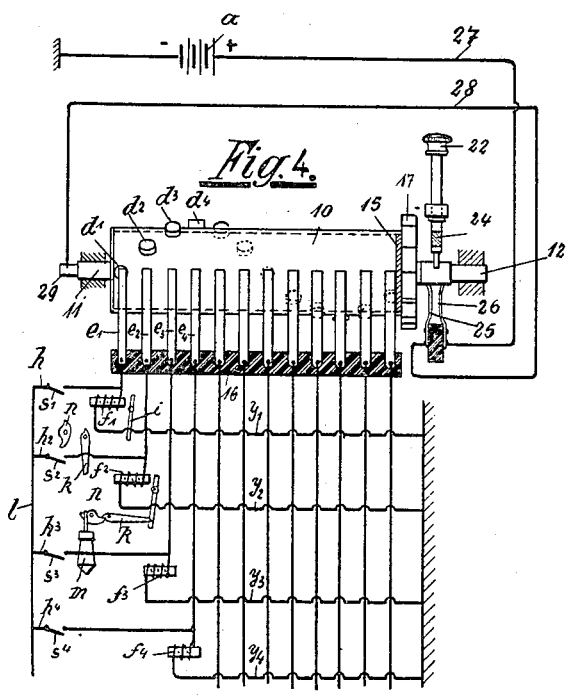
Figure 5:
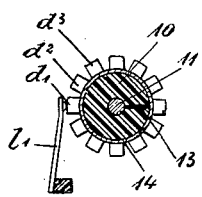
Figure 8:
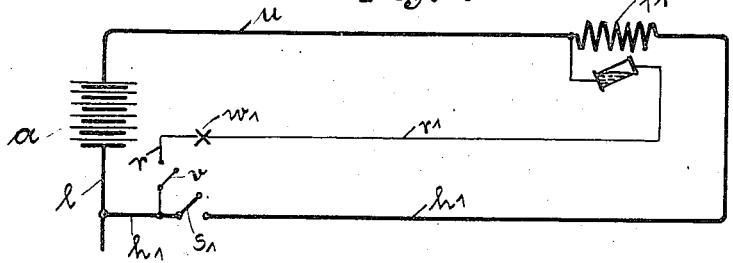
Figure 9:
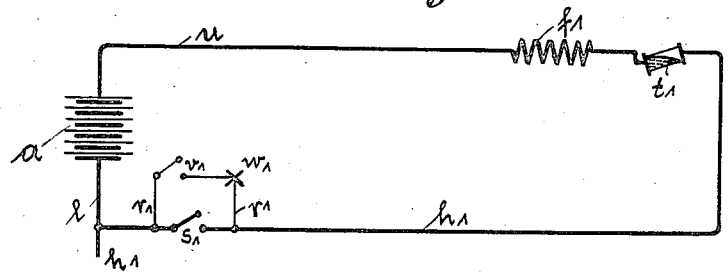
Figure 10:
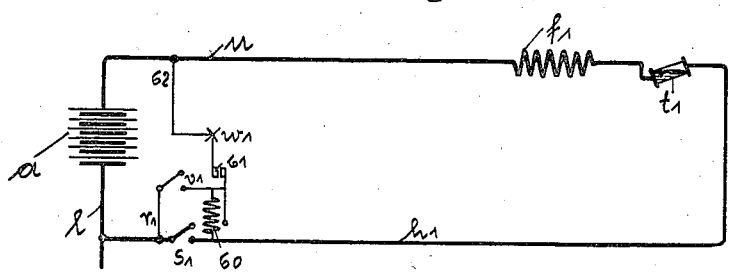

Various embodiments of the subject matter of my invention are shown by way of example in the accompanying drawings, in which:

Figs. 1 to 3 illustrate various switch diagrams,

Figs. 4, 5 and 6 a switch device with contact roller,

Fig. 7 a stopping device,

Figs. 8 to 10 illustrate a modified form of switch arrangement.

In all these cases the number of bombs entering into consideration is assumed to be, say, for example, twelve, though it is obvious that their number will be far greater in the majority of airships and fighting aircraft.

In the arrangement shown in Fig. 1, the battery $a$ is connected with the network by a switch $b$. At the point $c$ the line branches off, one branch running into the arm $d$ of the distributor, adapted to be moved across the contacts $e_1$, $e_2$, $e_3$, etc. Connected with these said contacts, are electromagnetic coils $f_1$, $f_2$, $f_3$, ..., which on the other hand are connected to a mass acting as the joint return conductor. At the point $c$ there is interconnected a line $l$, into which a switch $g$ is disposed. The parallelly arranged shunt branches $h_1$, $h_2$, $h_3$ ... from the line $l$ to the mains disposed intermediate the distributor contacts and the electromagnetic coils; each of the said branches $h_1$, $h_2$, $h_3$ ... embodying a switch $s_1$, $s_2$, $s_3$ ... The armature $i$ is arranged opposite to the iron core of the electromagnetic coil $f_1$, on which armature a lever $k$ is arranged to rest, which in its turn supports the lever $n$ on which the bomb $m$ is suspended. Intermediate the distributor contacts and the electromagnetic coils there are interposed plug contacts $o_1$, $o_2$, $o_3$ ...., the plugs being connected with line cables $p_1$, $p_2$, $p_3$ .... in the proximity of the distributor contacts.

If it be desired to drop the bombs successively by means of this improved arrangement, then the main switch $b$ is closed and the arm $d$ of the distributor is moved successively across the single contacts $e_1$, $e_2$, $e_3$, so that, if the plugs $o$ have been inserted, the current will flow from the battery across the point $c$ and the distributor contacts into the single electromagnetic windings and thence across the mass back to the battery. It will thus be seen that the electromagnets attract the armatures $i$ in succession, so that the lever $k$ will be deprived of its points of support; as a result the weight of the bomb will cause the lever system $n$, $k$, to tilt, and the bomb will drop off. Again, if it be not desired to throw off the bombs in accordance with the numerical succession in which they are hung up, but at random and successively, then, this object may be attained by merely changing over the plugs. Thus, if, for example, bombs No. 3, No. 6 and No. 11 are to be thrown off, while the indicator, which denotes the position of distributor, shows that the distributing arm is at this instant standing on No. 7, then all the plugs are removed, and the plug belonging to the distributor contact No. 8 is inserted in contact No. 3, that belonging to distributor contact No. 9 in No. 6, and the plug belonging to distributor contact No. 10 on to contact No.

11, whereupon the switching of the distributor is continued. As a result, bomb No. 3 will drop at contact No. 8, bomb No. 6 at contact No. 9, and bomb No. 11 at contact No. 10. Again, if the bombs No. 1 to 4 happen to be heavy bombs, bombs Nos. 5 to 8 light bombs, and bombs 9 to 12 gas bombs, then the object desired, namely of throwing off one of each set notwithstanding the distributor arm was enabled to merely shut the adjoining contacts Nos. 8, 9 and 10, will have been accomplished.

If, on the other hand, it be desired to throw off simultaneously a plurality of bombs, this may be done by aid of the shunt branches $h$. To this end, those switches of the shunt branches are first closed which appertain to the bombs about to be thrown off, whereupon the group switch $g$ is closed. Thus if, for example, the group comprising bombs Nos. 2, 5, 8, 10 is to be thrown off, then, after the group switch $g$ has been closed, the electromagnet $f_2$, $f_5$, $f_8$ and $f_{10}$ will be excited and the respective bombs will accordingly drop.

The form of execution disclosed in Fig. 2 merely differs from that subject to Fig. 1 by the fact of all the shunt branches, which are parallelly disposed among themselves, being divided into two parallel groups. The shunt branches $h_1$—$h_6$ are connected with the conductor $l$ by intervention of their switches $s_1$ to $s_6$; the groups $h_7$ to $h_{12}$ with the conductor $l_2$ by aid of their switches $s_7$ to $s_{12}$. Each of the branches $l_1$ and $l_2$ is controlled by a special group switch $g_1$ and $g_2$, respectively. At the same time always two switches of both groups are so disposed opposite to each other that they may be conveniently actuated by a common switch member. In the construction of the device as a knife contact (Fig. 2), a common knife thus serves to establish connection between the two oppositely disposed knife edges, in that said knife is shifted out of a central zero position either upward or downward. It will generally prove most expedient to suspend the one group of bombs on the right hand side and the other on the left hand side of the aircraft, and if, therefore after suitably setting the respective knife contacts, any desired number of shunt circuits be closed, then simply actuating the respective group switch will suffice to throw off the entire group. It is understood that the shunt branches might in this way be also divided into a plurality of parallelly disposed groups.

The construction disclosed in Fig. 3 distinguishes itself from that according to Fig. 1, by the feature of the common conductor, from which the parallelly disposed shunt lines are arranged to branch off, not being directly connected with the battery, but being merely connected through the shunt branches themselves with the lines disposed intermediate the distributor contacts and the electromagnets. Hence, the current is supplied to all the shunt branches through that particular shunt branch which happens to be located at the distributor contact just closed. Thus, for instance, assuming a group of bombs are to be thrown off simultaneously, the distributor in its position of rest be disposed intermediate the contacts $e_7$ and $e_8$, then the shunt switch $s_8$; thereupon the shunt switches of the bomb group about to be thrown off, say, $s_1$ to $s_4$ is closed, and the switching of the distributor continued in the ordinary manner. As soon as the distributor has closed the contact $e_8$, the current flows from the battery across the distributor contact $e_8$, through the shunt branch $h_8$ into the conductor $h$, whence it passes through the four parallel branches $h_1$ to $h_4$ to the respective electromagnets $s_1$ to $s_4$, so that the group of bombs Nos. 1 to 4 will drop off. At the same time, however, bomb No. 8 will of course also drop off because the distributor in the course of its motion closes the direct branch of the electromagnet $f_8$. In the event of it not being desired that the bomb appertaining to the distributor contact drop off along with the group, then the group switching arrangement indicated with respect to the arrangements disclosed in Figs. 1 and 2 must be employed, in which the distributor is entirely dispensed with. However, here again the form of execution shown in Fig. 3 embodies the advantage of no special group switch $g$ being required in that it is replaced by the distributor and that, by the interconnection of a main contact (drag contact), also the shunt switches will operate without emitting any sparks.

In Fig. 3 there is in addition shown the indicator lamp system. From the main line there is branched off a line $r$, from which, again run the conductors $r_1, r_2, r_3 \ldots$, which are conducted across a spring contact $t_1, t_2, t_3 \ldots$ to common conductor $u$.

By means of a push button switch $v$ the lamp circuit may be temporarily connected with the source of current. Within each of the lighting mains $r_1, r_2, r_3 \ldots$, which are disposed in parallel, there is lodged a small incandescent lamp $w_1, w_2, w_3 \ldots$ The stops $z_1, z_2, z_3 \ldots$ of the intermediate levers $k$, when the bomb is suspended in its place, force the spring contacts $t_1, t_2, t_3 \ldots$ against stationary contact blocks so that the respective lamp current branches will be closed. Hence, when the bomb is hanging in place, the lamps $w$ burn, provided the lighting switch $v$ be closed. However, as soon as the system of levers appertaining to the suspension means be released, and the levers $k$ tilt over, the stops $z$ cause the lamp contacts $t$ to open, so that the extinction of the lamp indicates that the bomb or the bombs has or have been thrown off. If thought expedient, the bombs may be distinguished, either singly or in groups, by means of multicoloured lights, and this simply by providing coloured glass bulbs for the indicator lamps. Such a distinction will prove particularly valuable in cases where different sorts of bombs are employed.

Now while the battery and the distributor, as also the switch levers, are disposed within and at a switch box arranged at the air pilot's stand, the magnets, serving to effect the release and therewith the dropping of the bombs, are disposed at a point of the frame of the aircraft remote from the switch box, while the mains leading to the electromagnets and to the lamps run along the craft in parallel to each other. In the event of the aircraft suddenly getting into the midst of the enemy's fire, there is the danger of the one or the other of these lines being destroyed by shot. This would entail the double drawback that the bomb throwing device may be rendered useless and that short circuit sparks will be created in consequence of which the gas-filled airship might be blown up. To obviate these drawbacks, each of the electromagnet mains, as also each of the lighting mains is provided both at the switch box as also close to the electromagnets with a plug switch. If now a magnet main happen to be suddenly destroyed use is immediately made of an adjoining lighting line for the purpose of in any case supplying the bomb-throwing device with current. It will be obvious that in such an extremity the operation of the indicator lamp belonging to this particular lighting line will be dispensed with. Thus, say, the electromagnet main 8 has been destroyed by fire from the enemy, while the lighting main 8 has remained intact, then plugs 36, 37, 38, 39 will be removed from these two lines, plug 36 being then inserted in contact 37, and plug 38 in contact 39, so that the current will now flow from the distributor contact $e$, across the plug contact 37, through the lighting main $r_8$ and across the plug contact 39 into the electromagnet $f_8$.

For the purpose of ascertaining when a short circuit has arisen at the electromagnet coils, and thus to prevent the possibility of a gas explosion, there is arranged within the circuit of the shunt branches an ohm-meter 40, adapted to be connected by means of the shunt switches with each of the single electromagnet coils. A potential resistance reduces the voltage to the degree required for the instrument. The ohmmeter is switched in by means of a double push button 43. The standard resistance of the electromagnet coils is indicated on the calibration. If this resistance is not attained then there exists a short circuit. In parallel to the ohm-meter there is arranged a comparison resistance 44 adapted to be put in by means of a switch 45. This resistance affords the possibility of measuring at the same time the voltage. For should the source of current have sunk substantially below the standard voltage, then the ohmmeter will indicate the resistance of the coil to be higher than it actually is. If now the comparison resistance be switched in, which possesses exactly the same resistance as the electromagnet coils, and if it be discovered that the deviation is the same for the comparison resistance as for the electromagnet coil, then it will have to be understood that the electromagnet coil is in order and that the deviation indicated on the measuring instrument is due to the varying voltage.

Figs. 4, 5 and 6 indicate a form of execution for the distributor, in which the gradual rotation of the movable distributor section is effected by means of a switch lever. By depressing the switch lever once, the distributor disc is always rotated forward for a span sufficient to secure the closing of a contact. An arrangement of this kind will prevent far better than an ordinary rotatable distributor arm the liability of a number of contacts being touched in quick succession. What is more, such a switch device, in the case of which the switch lever for each connection is struck in the manner of a piano key, may even be properly manipulated when the hand of the operator has become numbed by cold or been wounded.

The contact roller 10, which consists of an insulating material, is rotatably lodged in its pivots 11, 12. This roller supports the contact pins $d_1$, $d_2$, $d_3$, $d_4$ . . . all of which are electrically connected with the pivot 11, say, by means of a wire 13 and the metal layer 14 of the roller. By means of an insulating disc 15, the pivot 12 is electrically insulated from the contact pins and their connection. Within the circle of each contact pin there is arranged a stationary contact snap $e_1$, $e_2$, $e_3$, $e_4$ . . . These snap contacts are insulated the one from the other by being mounted on a block 16, composed of an insulating material. The switch wheel 17 is fixed to the roller, said wheel being driven by the pawl 18. The switch lever 19 which is adapted to freely rotate about the pivot 12, and which supports the pawls, is provided with a pan 20, in which the stem 21 of the switch handle 22 may lodge. A spring 23 draws the switch lever 19 and the handle 22 into their position of rest. A contact bridge 24 is moreover fixed to the switch lever 19, so as to be completely insulated, and which faces the two insulatingly disposed springs 25, 26 of a knife contact. This bridge will only then enter into engagement, on the switch handle being depressed, with the springs 25, 26, when the switch motion of the roller has so far progressed that the new distributor contact will be closed. A spark can therefore only arise at the knife contact, and this latter, to prevent the emission of sparks in the case of airships, is disposed within an oil-cage. The bombs are suspended on the hooks of the levers $n$, which with the intervention of the intermediate levers $k$, are disposed on the armatures $i$ of the electromagnets $f$. The electromagnet windings are disposed at the mass on the one hand by means of the snaps $e_1, e_2, e_3 \ldots$, on the other by aid of the conductors $y_1, y_2, y_3 \ldots$ while the negative pole of the battery is disposed at the mass, the positive pole is connected by the conductor 27 with the spring 26 of the knife contact. The other spring 25 of the knife contact is connected by a wire 28 with a sliding carbon 29, bearing down on the pivot 11.

The operation of the device is as follows: On the handle 22 being touched, the switch wheel 17 is moved forward for the space of a tooth by the pawl 18, and the contact pin $d$ disengages the snap $e_1$, while the contact pin $d_2$ glides below the respective snap $e_2$, retaining contact with this snap even after the switch motion has terminated.

After the contact pin $d_2$ has entered into contact with the snap $e_2$, the bridge 24 comes to be disposed between the springs 25, 26 of the knife contact. Owing to the clamping action which these springs exert on the contact bridge, the depressing of the handle 22 comes to be retarded, and even when the handle has been released and after the rotation of the switch roller has terminated, the spring 23 again requires a certain amount of time before it is able to withdraw the bridge 24 from the knife contact, and to set the pawl 18 on to the next tooth. The current, which flows from the positive pole of the battery across the spring 26, the bridge 24, the spring 25 of the knife contact into the contact carbon 29, and across the pivots 11 and the pin $d_2$ of the contact roller and the snap $e_1$ to the electromagnet $f_2$, and thence across the conductor $y_2$ and the mass back to the negative pole of the battery, thus has ample time to excite the electromagnet $f_2$ and to attract the armature $i$, so that the bomb will be sure to be thrown off.

To prevent the roller, owing to the inertia of the agitated mass, from shooting beyond the contact, there is provided an arresting device similar to the escapements arranged in clock-works (Fig. 7). The pin carrying disc 30 is firmly connected with the roller 10, while the switch lever 19 effects the movement of a tooth 31. This latter, as it rotates, depresses a bevelled lug 32, in consequence of which the escapement 33 is raised out of the disc 30 before the lost motion of the switch gear has been balanced. After the switch motion has been completed, the tooth 31 allows the lug 32 to resume its former position so that the escapement 33 will bear up against the next locking pin. A resilient stay wedge 34 serves to secure the exact displacement for the space of a tooth pitch.

In the place of the simple suspension of the bombs on levers, as hereinbefore set forth, use may also be made of a lever system which will automatically return into the supporting position required for suspending a fresh bomb.

In the case of fighting aeroplanes, the number of the bombs carried on board will be very big, say, about 120. For such a contingency the device serving to throw off the bombs is first of all provided with a contact roller, adapted to be gradually fed forward by means of a depressible switch lever, in the manner of the arrangement shown in Figs. 4 and 5. A second device provided for such aircraft, consists in a distributor, the movable half of which is rotated without intermission by means of a crank to enable the bombs to be thrown off rapidly in quick succession. However, to prevent the contacts from being operated too rapidly, and thus to avoid the possibility, which would result inevitably herefrom, of certain of the bombs not being released, i. e., dropped, there is interconnected between the hand crank and the rotating contact member a gearing, and this in such wise that three revolutions of the hand crank would have to be effected in order to once rotate the distributor drum.

In the case of the bomb-throwing device hereinbefore described, there is arranged at the air-pilot's stand a switch box containing the various switch levers, the measuring instrument, the indicator lamps, the insulating test instrument, etc. As the indicator lamps are controlled by means of a contact by the lever systems supporting the bombs, the lighting mains are naturally conducted from the switch box, in which the lamps and the lighting switches are contained, to the throw-off standards, and thence back to the battery. It thus follows that the lighting mains, like the mains of the electromagnets, constitute long outer mains in particular in the case of big aircraft, such as airships. Now this not only embodies a considerable consumption of conducting material, but furthermore the liability of short circuits.

This drawback may be obviated in accordance with a special feature of the present invention by the lighting main being so arranged that it will not directly bridge the throw-off switch of the electromagnet mains, and by the control contact disposed at the throw-off standard not being arranged in the lighting main but in the main of the electromagnet. This will give the result that one long outer main will now suffice in the place of two. And in addition there is obtained the advantage of obviating the possibility of a needless consumption of current, such as might be apt to arise if by mistake the electromagnet main were kept closed, by the control contact being adapted to open automatically.

The arrangement may be still further improved by merely interposing in the main bridging the throw-off switch, the coil of a relay controlling the circuit which contains the indicator lamp put in the direct shunt to the battery. The indicator lamps require a minimum current intensity of 0.1 amp. However, the possibility always exists that the intensity of this current might at some time suffice to excite the electromagnet coil while the throw-off switch is open and the lighting switch closed, and thus to cause the bomb to be thrown off at an undesired moment. Now to prevent such a possibility, only the relay coil of the lighting main is, in the case of this improved arrangement put in a direct shunt to the throw-off switch because, notwithstanding its capacity to reliably close the relay contact, it may obtain a far greater resistance than would be admissible for the indicator lamp. The current intensity of the relay coil may, for example, be reduced to 0.01 amp. Now with such a weak current, the electromagnet can under no circumstances be adequately excited, while the main of the relay coil is closed and the throw-off switch open, to enable a bomb to be thrown off at any undesired time.

With the view to rendering the difference between the last-mentioned form of connection and that herein previously described more evident, there is shown in Fig. 8 a diagram of the previous form of connection of the lighting circuit in combination with one of the main circuits of the electromagnet, say, with the group circuit $h$, $s$.

In Fig. 9 there is disclosed a form of execution of the revised arrangement of the connection, and in Fig. 10 a form of execution constituting an improvement thereon.

Subject to Fig. 8, the battery $a$ is connected by a main 1 and one of the branches, disposed in parallel, say, for example, branch $h_1$, across the group switch $s_1$ with the electromagnet $f_1$ of the throw-off standard, disposed by means of the return line at the battery. The lighting main $r$ is branched off at any point whatsoever of the main line, and contains the lighting switch $v$. The line $r_1$, in which is contained the lamp $w_1$, runs from the line $r$ to the contact $t_1$ controlled by the levers of the throw-off standards, arranged at a considerable distance away from the switch box.

Fig. 9 is intended to show how the long outer main $r_1$ may be dispensed with. The main line $h_1$ has in this case been in so far altered relatively to the arrangement shown in Fig. 8, that it is here made to contain the contact $t_1$ actuated by the levers of the throw-off standard in series connection with the coil $f_1$ of the electromagnet. The group switch $s_1$ is directly bridged by the respective branch $r_1$ of the lamp current within which there are disposed the indicator lamp $w_1$ and the lamp switch $v_1$. Hence, on the switch $v_1$ of the indicator lamp being closed, the lamp will burn while the throw-off switch is open. As soon as this latter ($s_1$) is closed, the bomb drops and the contact $t_1$, which is preferably constructed as a mercury contact will open the electromagnet main $h_1$. By these means, the lamp branch $r_1$ will, of course, be likewise deprived of current, and the sudden extinction of the indicator lamp $w_1$ denotes that the bomb has dropped.

Since the magnitude of the resistance for the indicator lamp $w_1$ cannot be selected so large that the possibility of the electromagnet $f_1$ being excited while the throw-off switch $s_1$ is open and the lamp circuit $r_1$ is closed, will be entirely excluded, the arrangement according to Fig. 9 is still further improved, as shown in Fig. 10, by merely the relay coil 60 being arranged with the branch $r_1$ bridging the throw-off switch $s_1$. The lamp $w_1$ is disposed in series with the relay contact 61. It is connected by means of main 62 with a point of return line disposed directly at the switch or at the adjoining battery, so that also in the case of this form of arrangement the provision of long outer mains for the lamp current branch may be dispensed with.

The operation of this connection is as follows: The throw-off switch $s_1$ being open, the lamp switch $v_1$ is closed so that the current branched off from the main $h_1$ with flow along $r_1$, $v_1$ through the relay coil 60 into the main $h_1$, and thence across the contact $t_1$ and the electromagnet coil $f_1$ back to the battery. Thereupon the relay coil 60 closes the relay contact 61, so that the lamp current will now flow along $r_1$, $v_1$, 61, into the indicator lamp $w_1$, and thence back through main 62 and the return line of the battery.

I claim:

1. In a system for releasing bodies from air craft in combination, a source of electric current, a main and a plurality of shunt circuits adapted to be connected with said source of current, a plurality of suspension devices and of electromagnets adapted to cooperate therewith and to be inserted in parallel in said circuits, a switch in each shunt circuit and a distributing switch adapted to insert said electromagnets, one after the other, in said main circuit.

2. In a system for releasing bodies from aircraft in combination, a source of electric current, a main and a plurality of shunt circuits adapted to be connected with said source of current, a plurality of suspension devices and of electromagnets adapted to cooperate therewith and to be inserted in parallel in said circuits, a switch in each shunt circuit and a distributing switch adapted to insert said electromagnets, one after the other, in said main circuit and means for interconnecting some of the parallel branches of said main circuit.

3. In a system for releasing bodies from aircraft in combination, a source of electric current, a main and a plurality of shunt circuits adapted to be connected with said source of current, a plurality of suspension devices and of electromagnets adapted to cooperate therewith and to be inserted in parallel in said circuits, a switch in each shunt circuit and a distributing switch adapted to insert said electromagnets, one after the other, in said main circuit, said shunt circuits being connected in parallel with said distributing switch and combined to form parallel groups, a main switch being provided for each group.

4. In a system for releasing bodies from aircraft in combination, a source of electric current, a main and a plurality of shunt circuits adapted to be connected with said source of current, a plurality of suspension devices and of electromagnets adapted to cooperate therewith and to be inserted in parallel in said circuits, a distributing switch adapted to insert said electromagnets, one after the other, in said main circuit, said shunt circuits being connected in parallel with said distributing switch and combined to form parallel groups, a main switch being provided for each group and switches disposed in the individual shunt circuits in such a manner that each switch is adapted to alternately throw in one or the other of a pair of shunts.

5. In a system for releasing bodies from aircraft in combination, a source of electric current, a plurality of suspension devices and of electromagnets adapted to cooperate therewith, a distributing switch adapted to connect said electromagnets, one after the other with said source of current, a plurality of shunt circuits, a main for all said circuits and a separate switch in each shunt circuit, said shunt circuits being arranged to be connected to said source of current only by way of said distributing switch and said separate switches.

6. In a system for releasing bodies from aircraft in combination, a source of electric current, a main and a plurality of shunt circuits adapted to be connected with said source of current, a plurality of suspension devices and of electromagnets adapted to cooperate therewith and to be inserted in parallel in said circuits, a switch in each shunt circuit and a distributing switch adapted to insert said electromagnets, one after the other, in said main circuit, a lamp circuit connected in parallel with each electromagnet circuit and adapted to be opened on the suspension device appertaining to the respective electromagnet being released and plug switches inserted at either end of each electromagnet circuit.

7. In a system for releasing bodies from aircraft in combination, a source of electric current, a main and a plurality of shunt circuits adapted to be connected with said source of current, a plurality of suspension devices and of electromagnets adapted to cooperate therewith and to be inserted in parallel in said circuits, a switch in each shunt circuit, a distributing switch adapted to insert said electromagnets, one after the other, in said main circuit, a lamp circuit connected in parallel with each electromagnet circuit and adapted to be opened on the suspension device appertaining to the respective electromagnet being released, a lamp circuit bridging the switch of said electromagnet circuit and a contact to be opened, as said suspension device is released, said contact being connected in series with said electromagnet.

8. In a system for releasing bodies from aircraft in combination, a source of electric current, a main and a plurality of shunt circuits adapted to be connected with said source of current, a plurality of suspension devices and of electromagnets adapted to cooperate therewith and to be inserted in parallel in said circuits, a switch in each shunt circuit and a distributing switch adapted to insert said electromagnets one after the other, in said main circuit, a shunt circuit bridging the switch of each electromagnet circuit, a relay coil inserted in said shunt circuit and a lamp circuit connected to said coil and shunted to said source of current and a contact in series with said electromagnet and adapted to influence the operative condition of said shunt circuit.

9. In a system for releasing bodies from aircraft in combination, a source of electric current, a main and a plurality of shunt circuits adapted to be connected with said source of current, a plurality of suspension devices and of electromagnets adapted to cooperate therewith and to be inserted in parallel in said circuits, a switch in each shunt circuit, a distributing switch adapted to insert said electromagnets, one after the other, in said main circuit and a drag switch connected in series with said distributing switch and adapted to be actuated whenever said distributing switch is operated.

10. In a system for releasing bodies from aircraft in combination, a source of electric current, a main and a plurality of shunt circuits adapted to be connected with said source of current, a plurality of suspension devices and of electromagnets adapted to cooperate therewith and to be inserted in parallel in said circuits, a switch in each shunt circuit, a distributing switch adapted to insert said electromagnets, one after the other, in said main circuit, a measuring instrument connected in series with said shunt circuits, a resistance connected in series and another resistance connected in parallel with said instrument and a switch intermediate said latter resistance and said instrument.

11. In a system for releasing bodies from aircraft in combination, a source of electric current, a main and a plurality of shunt circuits adapted to be connected with said source of current, a plurality of suspension devices and of electromagnets adapted to cooperate therewith and to be inserted in parallel in said circuits, a switch in each shunt circuit, a distributing switch adapted to insert said electromagnets, one after the other, in said main circuit a measuring instrument connected in series with said shunt circuits a resistance connected in series and another resistance connected in parallel with said instrument, a switch intermediate said latter resistance and said instrument and a coil and switch connected in parallel with said electromagnets.

In testimony whereof I affix my signature.

OSCAR WILCKE.